(12) United States Patent
Heckmayr

(10) Patent No.: US 6,786,511 B2
(45) Date of Patent: Sep. 7, 2004

(54) SEAT BELT RETRACTOT WITH HYDRAULIC LOAD LIMITING

(75) Inventor: Thomas Heckmayr, Rammingen (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 82 days.

(21) Appl. No.: 10/259,449

(22) Filed: Sep. 30, 2002

(65) Prior Publication Data

US 2003/0189331 A1 Oct. 9, 2003

(30) Foreign Application Priority Data

Apr. 9, 2002 (DE) .......................... 102 15 539

(51) Int. Cl.[7] .............................................. B60R 21/28
(52) U.S. Cl. ...................................... 280/805; 242/381
(58) Field of Search ............................. 280/805, 806, 280/807; 242/379.1, 381; 297/470; 188/318

(56) References Cited

U.S. PATENT DOCUMENTS

| | | | |
|---|---|---|---|
| 3,901,345 A | | 8/1975 | Fieni .......................... 180/91 |
| 5,037,132 A | * | 8/1991 | Borlinghaus et al. ....... 297/470 |
| 6,129,385 A | * | 10/2000 | Blackadder ................. 280/805 |
| 6,209,916 B1 | * | 4/2001 | Smithson et al. ........... 280/805 |
| 6,237,959 B1 | * | 5/2001 | Hishon ....................... 280/807 |
| 6,290,159 B1 | | 9/2001 | Specht et al. ............. 242/379.1 |
| 6,719,233 B2 | * | 4/2004 | Specht et al. ............. 242/379.1 |
| 2002/0134877 A1 | | 9/2002 | Glinka ..................... 242/379.1 |

FOREIGN PATENT DOCUMENTS

| | | | |
|---|---|---|---|
| DE | 2148294 A1 | * 8/1973 | |
| DE | 2238169 | 2/1974 | |
| DE | 4342666 | 6/1994 | |
| DE | 19963580 | 8/2001 | |
| DE | 19902483 C2 | 12/2001 | |
| DE | 10034393 A1 | 1/2002 | |
| EP | 0629531 | 6/1994 | |
| EP | 0778182 | 12/1996 | |
| FR | 2695603 A1 | * 3/1994 | ........... B60R/22/28 |

\* cited by examiner

*Primary Examiner*—David Dunn
(74) *Attorney, Agent, or Firm*—Lonnie Drayer

(57) ABSTRACT

A seat belt retractor for a vehicle seat belt has a belt reel for the seat belt. A free-flowing load limiting medium is arranged in a working chamber. A displacement means is drivable by the belt reel. The load limiting medium is transported through at least one flow channel by the displacement means. The flow cross-section in the flow channel is selected as a function of the kinematic viscosity of the load limiting medium, to achieve a belt force limitation profile over time which approaches that of a torque rod.

5 Claims, 6 Drawing Sheets

SEAT BELT RETRACTOT WITH
HYDRAULIC LOAD LIMITING

FIELD OF THE INVENTION

The invention relates to a seat belt retractor.

DISCUSSION OF THE PRIOR ART

U.S. Pat. No. 6,290,159 teaches a seat belt retractor wherein the load limiting effect of a load limiter in the form of a hydraulic pump is adjusted as a function of a measuring signal, which is formed by sampling the rotary motion of the belt reel after blocking of the blockable part of the belt reel. A controllable valve with adjustable flow cross-section may be provided to this end.

A force limiter for a vehicle seat belt is known from DE 22 38 169 which takes the form of a shock absorber with movable shock absorber pistons.

A load limiter is likewise known from U.S. Pat. No. 3,901,345 for a vehicle safety means, in which the damping behavior of a hydraulic damper in the form of a piston/cylinder arrangement is adjusted.

A load limiter in the form of a damping means and constituting a component of a motor vehicle safety system is known from DE 199 63 580 C2, the damping medium of which is a rheological fluid of adjustable viscosity. The level of viscosity of the fluid and thus the damping property of the load limiter may be adjusted by an electrical or magnetic field.

In the present invention, the flow cross-section of the at least one flow channel, through which the load limiting medium is transported by the displacement means, has a constant area, the dimensions of which are selected as a function of the kinematic viscosity of the load limiting medium within certain limits, as will be explained in detail below.

To move the load limiting medium, which comprises an incompressible, free-flowing medium, for example oil, in particular silicone oil, a displacement means, for example a piston, may be provided which is driven by the belt reel via a rack and pinion gear. Moreover, a displacement means may be used that takes the form of a piston movable along the belt reel axis and relative to which the belt reel is rotatable. The displacement means may be effected by the belt reel via a thread or via cutting engagement. Due to the constant flow cross-section of the flow channel, a profile over time of the belt force may in particular be achieved which resembles that generated by a load limiter in the form of a torque rod.

DETAILED DESCRIPTION OF THE INVENTION

The exemplary embodiments shown in FIGS. 1 to 4 of a seat belt retractor each have a belt reel 1 for a seat belt 8, which may be wound onto the belt reel 1 and taken off from the belt reel 1. In addition, the exemplary embodiments each have a load limiter, which is differently embodied in the various exemplary embodiments.

Figure 1A:
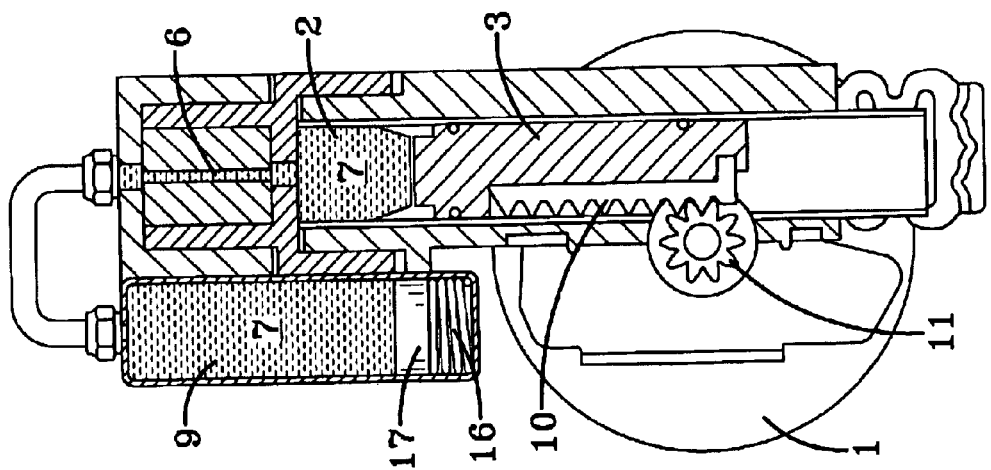
FIGS. 1a–1c shows various operating states of a first exemplary embodiment of a seat belt retractor according to the present invention.
Figure 1B:
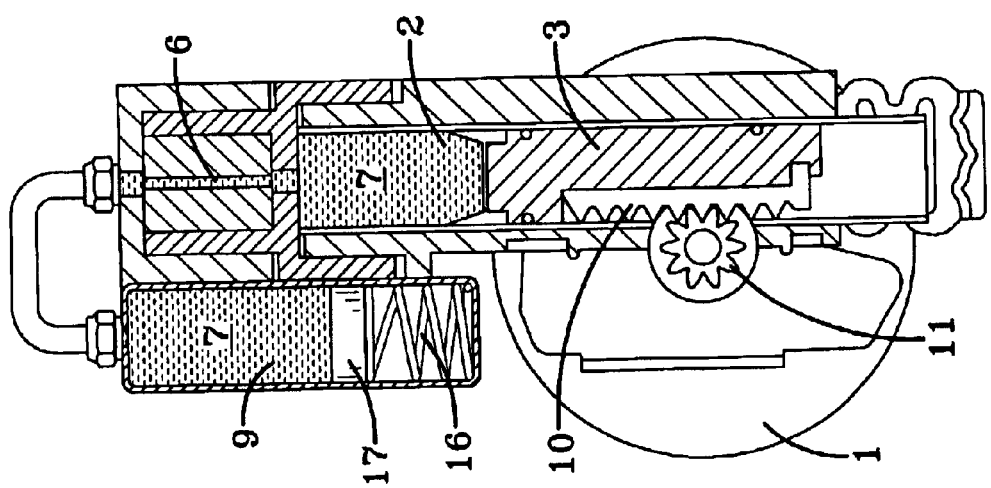
Figure 1C:
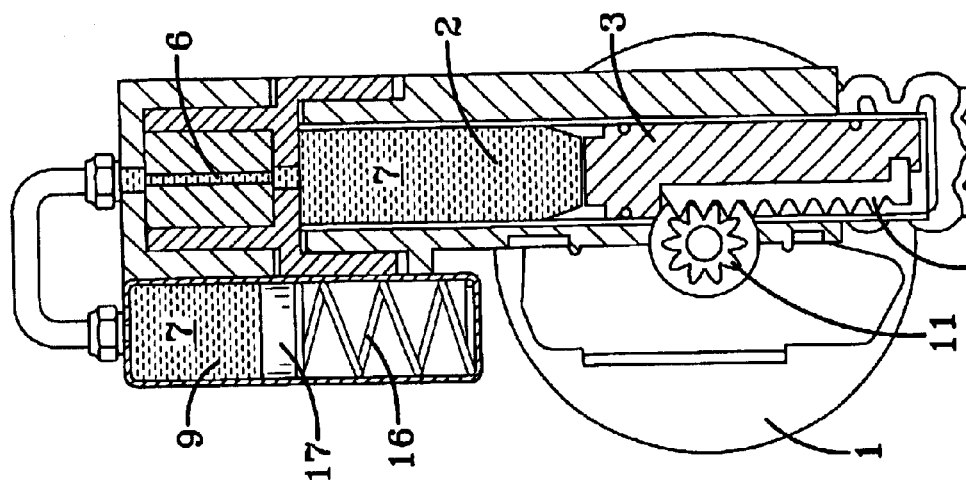

In the seat belt retractor shown in FIGS. 1a–1c, the load limiter has a free-flowing load limiting medium 7 in a working chamber 2 located inside of a cylinder 14. Furthermore, the load limiter has in the working chamber 2 a displacement means in the form of a linearly movable first piston 3. In an overflow means at the upper end of the working chamber 2 there is located a flow channel 6. The flow channel 6 opens into a collecting chamber 9, which is bounded by a second piston 17 that is movable against the force of a spring 16.

The first piston 3 also has the function of a tightening drive, as known for example from EP 0629531 B1. In the operating position shown in FIG. 1a, the first piston is at the end of the tightening stroke, during which the seat belt 8 was wound onto the belt reel 1 to tighten it. The piston movement is transmitted via a rack 10 to a pinion 11 that is in drive connection with the belt reel 1.

The mode of operation of the exemplary embodiment shown in FIGS. 1a–1c in the event of force limitation is as follows. If tension above a force threshold is exerted on the seat belt 8 in the operating position shown in FIG. 1a for example by the body of a forwardly displaced, seat-belted vehicle occupant, the belt reel 1 rotates in the opposite direction to the tightening direction. This rotational movement is transmitted via the pinion 11 and the rack 10 to the first piston 3. If the force exerted by the forwardly displaced body of the vehicle occupant on the seat belt 8 exceeds the set threshold, the first piston 3 is moved out of the operating position shown in FIG. 1a in the opposite direction to the tightening direction (from bottom to top in FIGS. 1a–1c). The load limiting medium 7 is transported out of the working chamber 2 through the flow channel 6 and consumes energy. The restraining force exerted on the seat-belted vehicle occupant by the seat belt 8 is limited or reduced thereby. The load limiting medium 7 flowing through the flow channel 6 passes into the collecting chamber 9. The second piston 17 is moved against the force of the spring 16, to enlarge the volume of the collecting chamber 9 (from top to bottom in FIGS. 1a–1c). As a function of the energy transmitted to the linearly movable first piston 3 upon forwards displacement of the vehicle occupant, the second piston is moved contrary to the tightening direction into a set end position and a corresponding volume of load limiting medium 7 moves out of the working chamber 2 through the flow channel 6 into the collecting chamber 9. The first piston 3 may for example assume an operating position illustrated in FIG. 1b at the end of the piston movement.

The operating position illustrated in FIG. 1c forms an end stop, as far as which the first piston 3 may be moved in the event of load limitation. The spring 16 is compressed completely, into a block, in this operating state and the second piston 17, which defines the volume of the collecting chamber 9, is located in its end position.

Figure 2:
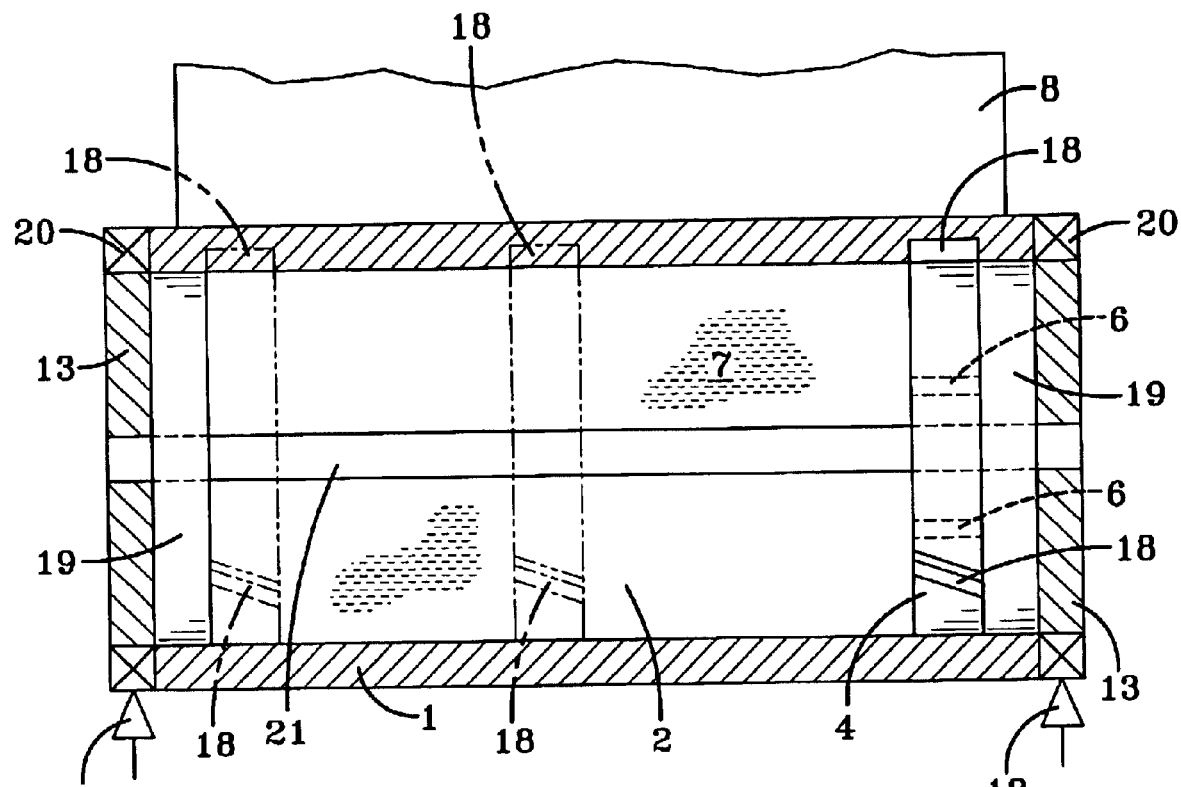
FIG. 2 is a sectional representation of a second exemplary embodiment.
Figure 3:
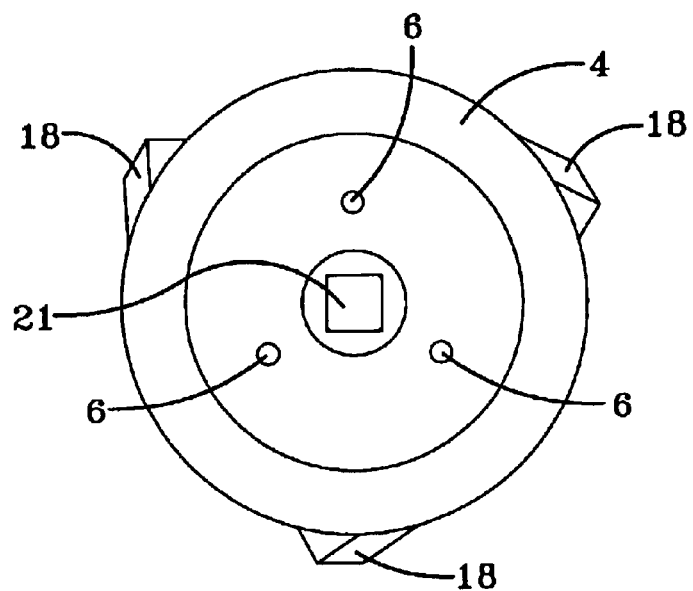
FIG. 3 shows a cutting piston that is used in the embodiment of FIG. 2.

In the exemplary embodiment illustrated in FIG. 2, the load limiter includes a cutting piston 4, which is moved in the axial direction in a cavity in the belt reel constituting the working chamber 2. To this end, the cutting piston 4 engages with cutting edges 18, which may cut into the material of the belt reel 1, in the internal circumferential surface of the drum of the belt reel 1. For this purpose, the cutting piston 4 has at least one obliquely positioned cutting edge 18 at its circumference. However, a plurality of, e.g. three cutting edges 18 (FIG. 3) may be distributed over the circumference. Such a piston is known as a driving piston, for example from DE 43 42 666 C2 or EP 0 778 182 A2, for a tightening drive for tightening the seat belt. At the start of load limitation, the cutting piston 4 is in a starting position, which constitutes the operating position shown in FIG. 2 with solid lines (at the right-hand reel end), for example. The cutting piston 4 adjoins an end disk 19 closing the belt reel cavity in fluid-tight manner. At the other end face, too, the inside of the belt reel is closed in fluid tight manner by a further end disk 19. The cutting piston 4 has one or more, e.g. three, flow channels 6 therethrough. Inside the belt reel 1 the load limiting medium 7, which may be a viscous liquid, for example silicone oil, is located in the working chamber 2. Outside the two end disks 19 are located toothed disks 13, in the circumferentially disposed teeth 20 of which a blocking means 12, for example blocking catches, may engage. In normal belt retractor operation, the end disks 19 and the toothed disks 13 are connected non-rotatably with one another.

A guide bar 21 extends coincidental with in the axis of rotation of the belt shaft. The cutting piston 4 is mounted on the guide bar 21 so as to be displaceable in the axial direction. The guide bar 21 has a non-circular, e.g. square, cross-section, such that the rotary piston 4 is mounted non-rotatably thereon. The two toothed disks 13 are likewise connected non-rotatably with the guide bar 21. The two end disks 19 are mounted rotatably on the guide bar 21.

If a selected force threshold is exceeded by forwards displacement of the body of the seat-belted vehicle occupant in the event of the toothed disks 13 being blocked by a blocking means 12, the non-rotatable connection between the belt reel 1 and the toothed disks 13 is released, in particular in the area of the end disks 19. In this regard, shearing pins, not described in any more detail, may be sheared off. Upon rotation of the belt reel 1, the rotary piston 4 engages with its cutting edges 18, positioned obliquely relative to the axial direction, in the inner drum surface of the belt reel 1 and is moved in the axial direction out of its starting position (initial, right-hand position in FIG. 2) to the left along the guide bar 21. Load limiting medium 7 is then moved through the at least one flow channel 6 in the rotary piston 4 out of the working chamber 2 located on one side (left-hand side) of the rotary piston 4 into the part of the working chamber 2 located on the other side (right-hand side) of the rotary piston 4. Energy is thus consumed to limit the force acting between the body of the vehicle occupant and the seat belt 8. As a function of the energy acting during forwards displacement of the vehicle occupant, the cutting piston 4 moves into an axial end position, which may for example be the dash-dotted position indicated in FIG. 2. The cutting piston 4 may be moved as far as into a final end position, shown by dashed lines, at the left-hand end of the belt reel 1. The end disk 19 located there acts as an end stop. The material of the cutting piston 4 may embed itself at the cutting edges 18 into the material of the belt reel 1 on axial movement of the rotary cutting piston 4. The material of the cutting piston 4 is harder than the material of the belt reel 1 at least in the area of the internal circumferential surface of the drum of the belt reel 1. Through the engagement of the cutting edge 18 positioned obliquely relative to the axial direction of the belt reel 1, rotary motion of the belt reel 1 is converted into linear axial movement of the cutting piston 4 as a result of the non-rotatable guidance along the guide bar 21. Axial displacement may however also be achieved by a thread, which acts between the belt reel 1 and the displacement means constructed as a piston, in particular a rotary piston.

Figure 4:
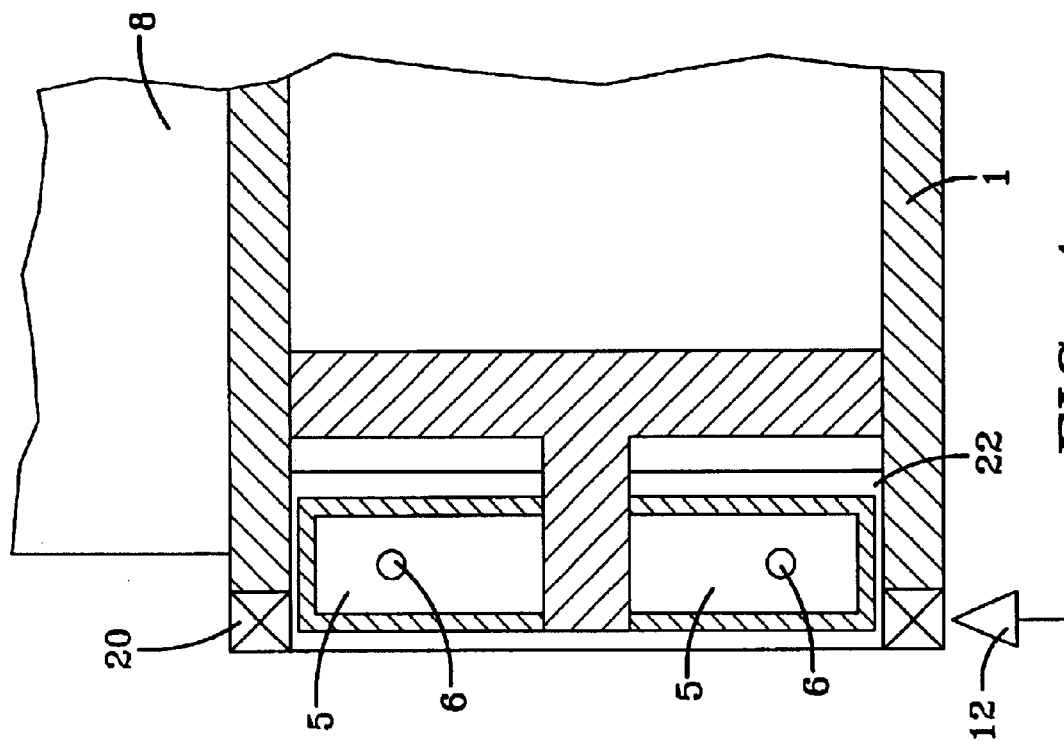
FIG. 4 is a schematic representation of a third exemplary embodiment in partial longitudinal section.
Figure 5:
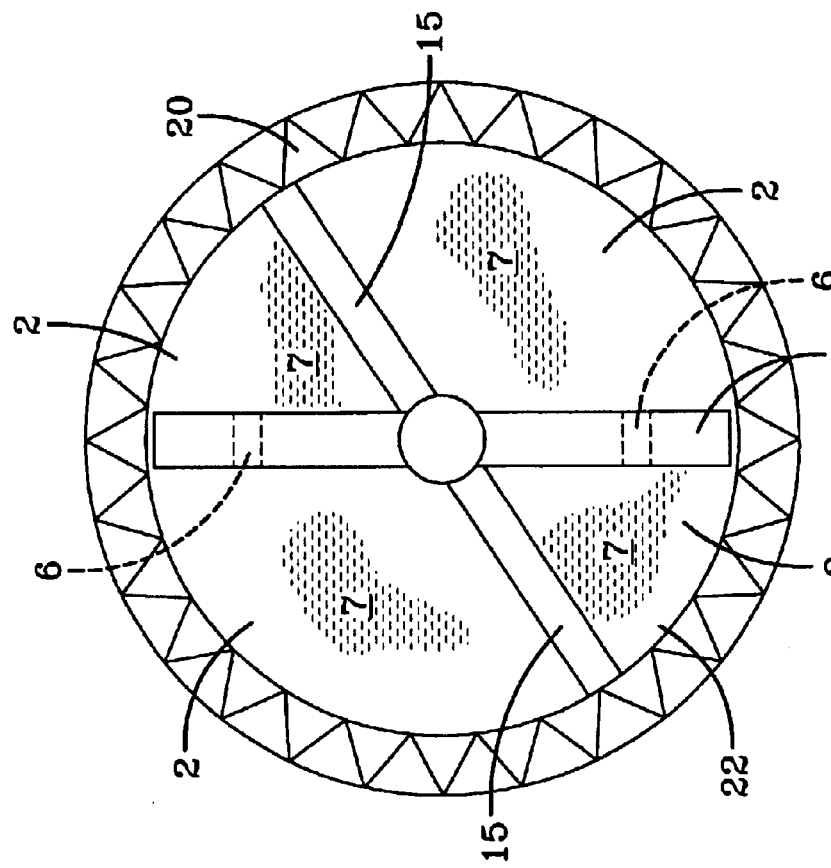
FIG. 5 shows a cross-section through the exemplary embodiment of FIG. 3.

In the exemplary embodiment illustrated in FIGS. 4 and 5, a rotor 5, for example with one or more rotary vanes, which comprise one or more flow channels 6, is moved in a load limiting medium 7 for the purpose of force limitation.

The working chamber 2 with the load limiting medium 7 and the displacement means in the form of a rotor 5 is located in a housing 22, which is connected non-rotatably with the blocking teeth 20. In normal operation of the seat belt retractor, the housing 22 rotates with the belt reel 1. If, in the event of forward displacement of the seat-belted vehicle occupant, a force threshold is exceeded, the non-rotatable connection is released between the housing 22 and the drum of the belt reel 1 on which the seat belt 8 is wound. The rotor 5 remains non-rotatably connected with the belt reel 1. In the event of force limitation, the rotor 5 rotates together with the belt reel 1, wherein the load limiting medium 7 is transported through the at least one flow channel 6 from one side of the rotor out of the working chamber 2 into the part of the working chamber 2 located on the other side of the rotor. For this purpose, energy is consumed and the force acting between the seat belt and the body of the seat-belted vehicle occupant is limited. Depending on the amount of energy used in the event of forwards displacement of the vehicle occupant, the rotor 5 is moved into an end position, optionally as far as an end stop at the radially extending wall 15 fixed to the housing.

The cross-sectional area of the at least one flow channel 6 in the exemplary embodiments of FIGS. 1 to 5 is dimensioned within certain limits as a function of the viscosity of the load limiting medium 7 and as a function of the type of displacement means. The range within which the cross-sectional area may be selected is selectable within a range, in the case of a linearly movable displacement means, such as for example a linearly movable first piston 3 of the exemplary embodiment of FIG. 1 and a linearly movable piston 4 of the exemplary embodiment of FIG. 2, which is delimited by the two curves KL1 and KL2 of FIG. 6. The values of the viscosities of the load limiting medium 7 are plotted on the x-axis and the areas of the cross-sections of the flow channel or flow channels 6 are plotted on the y-axis of the graph. The cross-sectional areas selectable in the case of linearly or translatorily drivable displacement means are located in the hatched zone between the two delimiting curves KL1 and KL2.

Figure 6:
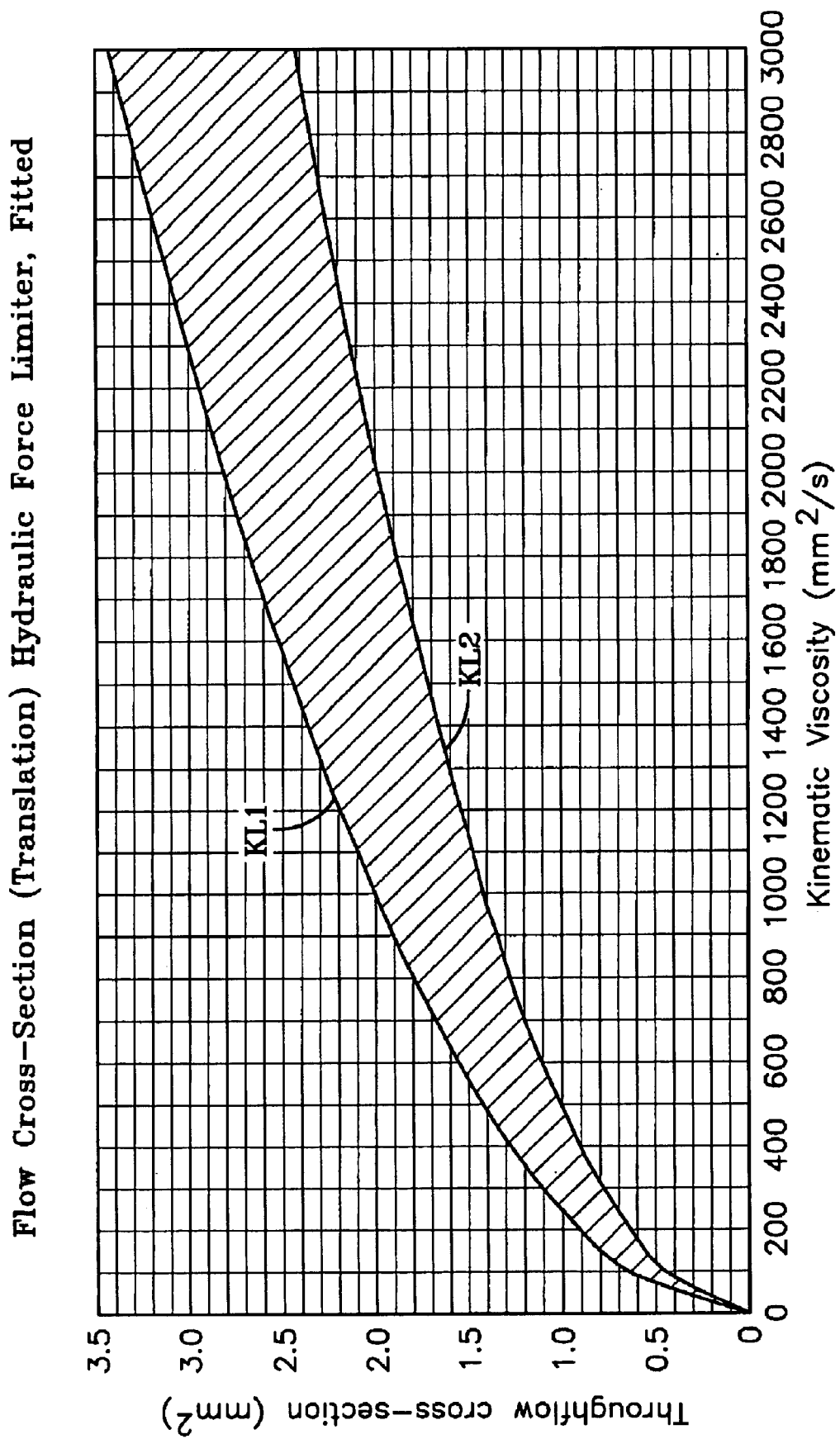
FIG. 6 is a graph of a range for flow cross-sections of the flow channel in the case of a displacement means for various kinematic viscosities of the load limiting medium.
Figure 7:
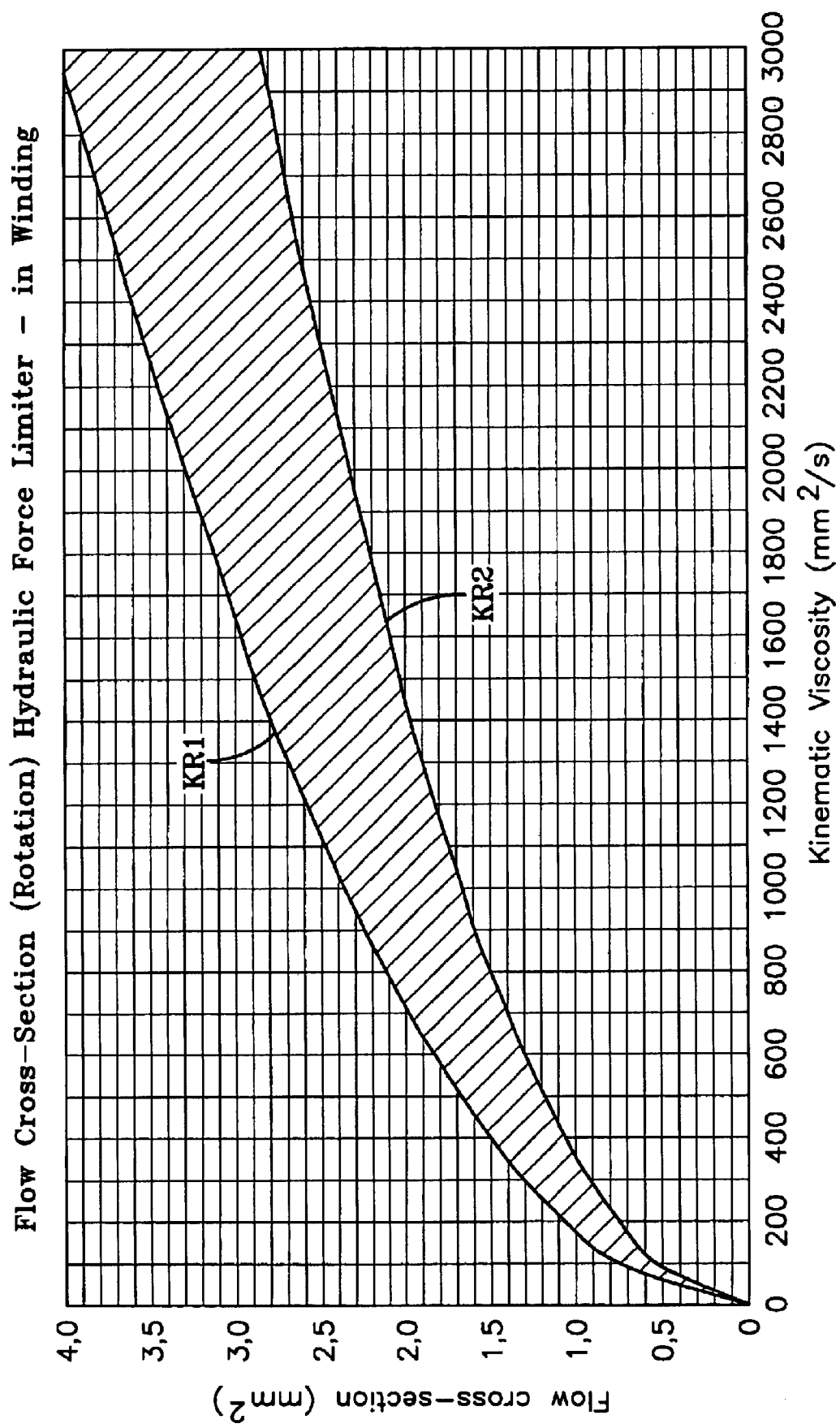
FIG. 7 is a graph of a range for flow cross-sections of the flow channel in the case of rotary displacement means for various kinematic viscosities of the load limiting medium.

FIG. 7 shows the range for the cross-sectional area of the flow channel or flow channels 6 in the case of a displacement means constructed as a rotor, for example rotor 5 in the exemplary embodiment of FIGS. 4 and 5. The range for the cross-sectional area selectable as a function of the viscosity of the load limiting medium 7 is delimited by the two delimiting curves KR1 and KR2. As in FIG. 6, the kinematic viscosities of the load limiting medium are plotted on the x-axis and the areas of the flow cross-sections of the flow channel 6 are plotted on the y-axis.

Figure 8:
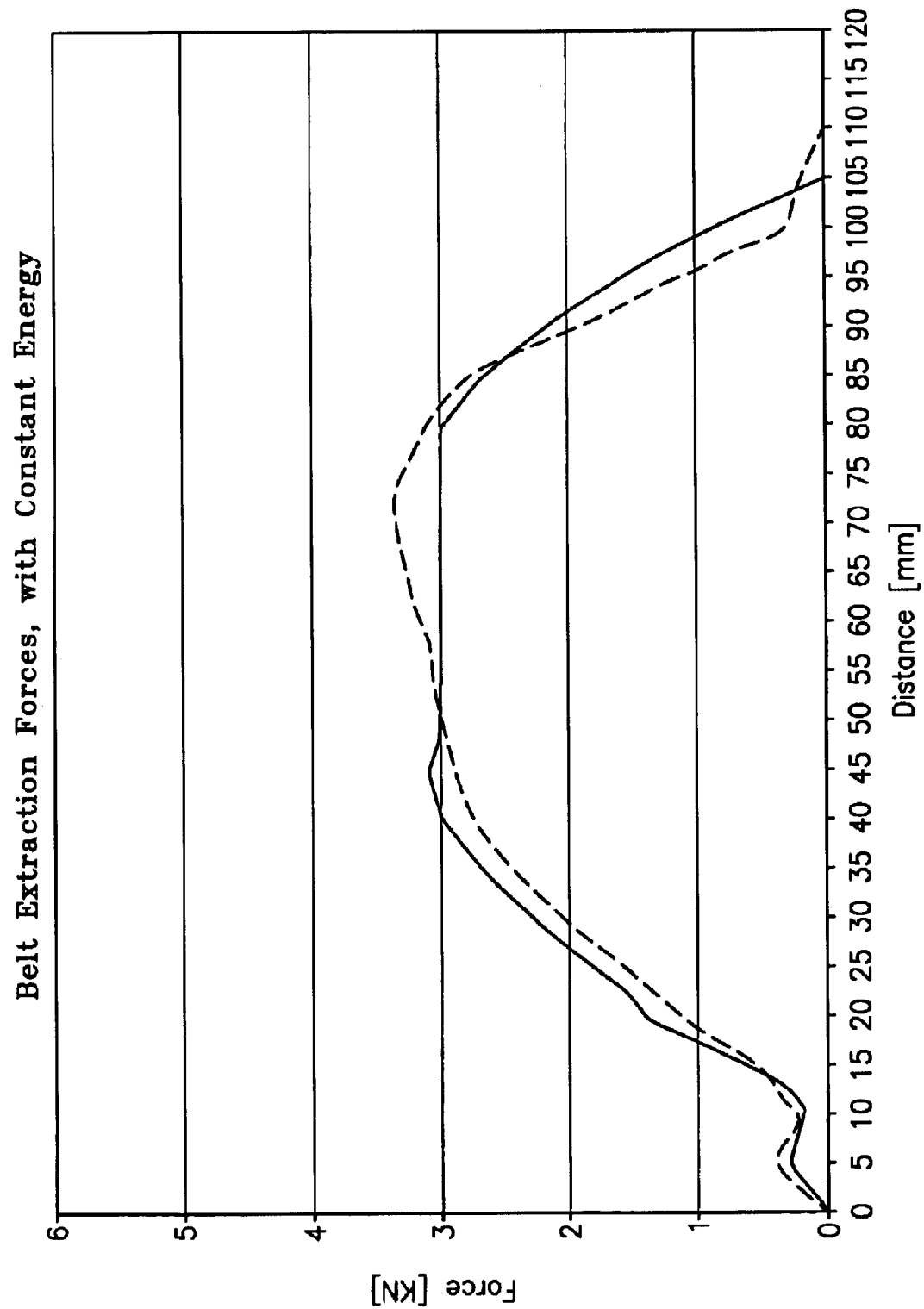
FIG. 8 shows the profile over time of belt extraction forces for a torque rod and for an exemplary embodiment of the invention in the case of constant energy.

As is clear from FIG. 8, where a constant energy acts on the seat belt 8 and where the cross-sectional area of the flow channel 6 is dimensioned in accordance with FIGS. 6 and 7, a force effect similar to that of a torque rod arranged along the axis of rotation of the belt reel is achieved. In FIG. 8, the force acting on the belt webbing is plotted on the y-axis and the length of seat belt 8 taken off from the belt reel 1 during forwards displacement of the seat-belted vehicle occupant is plotted on the x-axis. The solid line denotes the force limiting curve of a torque rod and the dash-dotted line corresponds to the force limiting characteristic curve of the exemplary embodiments, if the areas of the flow cross-sections are selected within the ranges indicated in FIGS. 6 and 7. If a plurality of flow channels are provided, the sum of their flow cross-sections are so selected that they lie in the hatched zones of FIGS. 6 and 7. These zones cover the energies occurring in accidents of varying severity due to forward displacement of the respective vehicle occupant.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

I claim:

1. A seat belt retractor comprising:
   a belt reel;
   a free-flowing load limiting medium arranged in a working chamber;
   a displacement means drivable by the belt reel the displacement means being either a linear displacement means or a rotary displacement means;
   at least one flow channel through which the load limiting medium is transported by the displacement means in the direction of linear or rotational displacement;
   the flow cross-section in the at least one flow channel exhibits, as a function of the kinematic viscosity of the load limiting medium, a constant area, the dimensions of which lie, in the case of a linear displacement means, in the range delimited by the two curves (KL1, KL2) in FIG. 6, the constant area being less than 3.5 mm$^2$ at kinematic viscosities of less than 3000 mm$^2$/s, or in the case of a rotary displacement means, in the range delimited by the two curves (KR1, KR2) in FIG. 7, the constant area being 4 mm$^2$ or less at kinematic viscosities of less than 3000 mm$^2$/s.

2. The seat belt retractor according to claim 1, wherein the linear displacement means is driven by the belt reel via a rack and pinion gear.

3. The seat belt retractor according to claim 1, wherein the linear displacement means is a piston that is non-rotatable and linearly movable along the belt reel axis a guide bar, which piston is linearly driven by the rotation of the belt reel by means of cutting engagement.

4. The seat belt retractor according to claim 1, wherein the rotary displacement means is a rotary vane rotor, which is connected non-rotatably with the belt reel.

5. The seat belt retractor according to one of claims 1 to 4, wherein a belt force profile over time is produced at the seat belt which approaches the belt force profile of a force limiter constructed as a torque rod.

* * * * *